May 28, 1968 W. H. WEST 3,385,547
VEHICLE BODY COAT HOOK
Filed Dec. 14, 1966
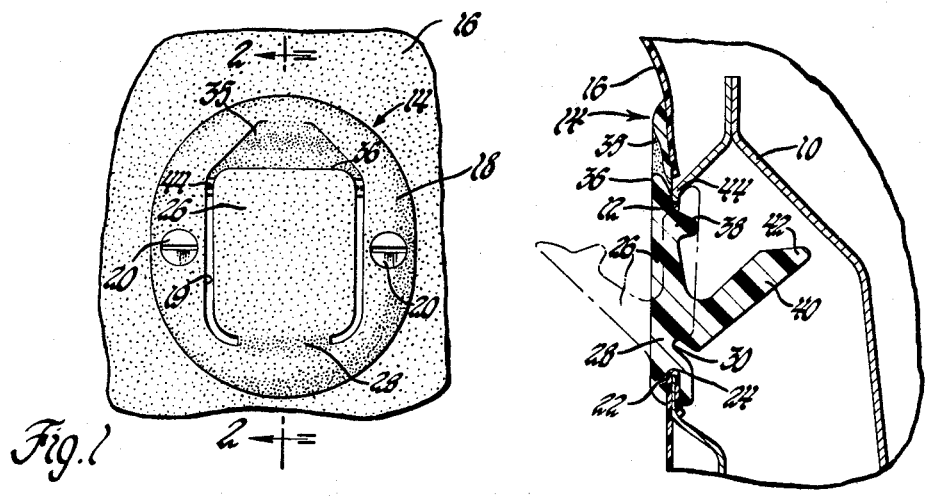
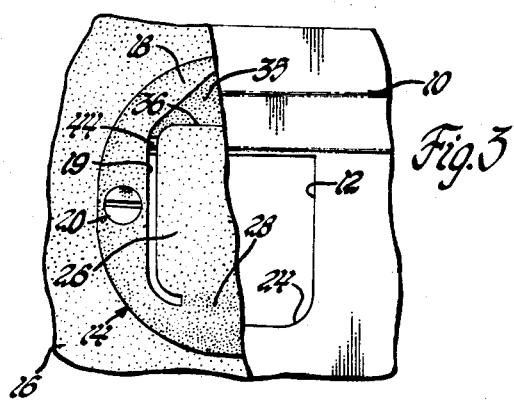
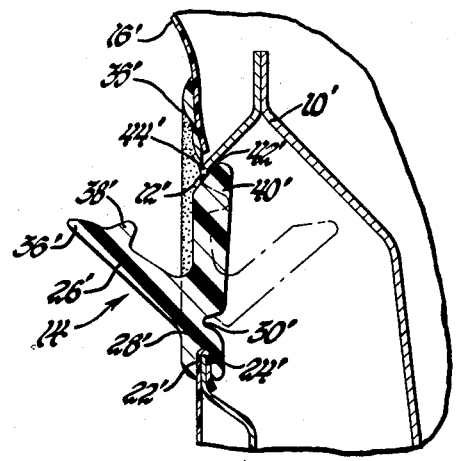
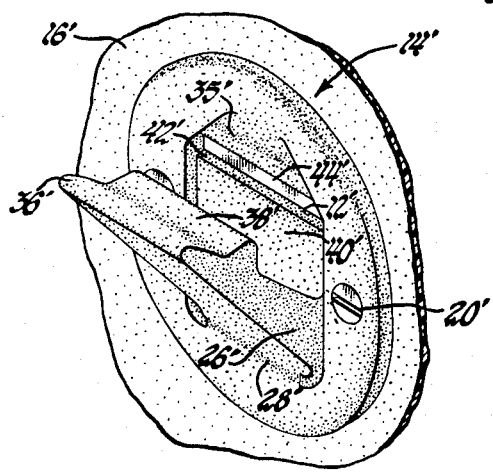
INVENTOR.
BY Wilson H. West
David A. Greenlee
ATTORNEY

United States Patent Office 3,385,547
Patented May 28, 1968

3,385,547
VEHICLE BODY COAT HOOK
Wilson H. West, Royal Oak, Mich., assignor to General Motors Corporation, Detroit, Mich., a corporation of Delaware
Filed Dec. 14, 1966, Ser. No. 601,600
5 Claims. (Cl. 248—205)

ABSTRACT OF THE DISCLOSURE

A unitary plastic coat hook has a hook portion movable between a stored position within a vehicle body support and an extended operative position the hook portion being biased to stored position in one embodiment and biased to operative position in another embodiment.

---

Conventionally, vehicle bodies are provided with one or more coat hooks which are mounted on the side rails within the passenger compartment and from which garments and hangers may be suspended. These coat hooks comprise stationary rigid members projecting interiorly of the passenger compartment.

One feature of this invention is that it provides a coat hook mounted flat against a vehicle body support or side rail and having a hook portion movable between a flat stored position and an extended operative position. Another feature is that the coat hook is formed of a flexible molded plastic and includes a resilient unitary hinge having means biasing the hook portion to either of its positions. A further feature is that stop means are provided to limit movement of the hook portion relative to the side rail.

These and other features of this invention will become readily apparent upon reference to the following detailed description of the attached drawings in which:

FIGURE 1 is an elevational view of a coat hook according to this invention, with the hook portion located in stored position;

FIGURE 2 is a sectional view taken generally on the plane indicated by line 2—2 of FIGURE 1;

FIGURE 3 is a partially broken away view similar to FIGURE 1;

FIGURE 4 is a view similar to FIGURE 2 showing an alternative embodiment of the invention; and FIGURE 5 is a perspective view of the embodiment shown in FIGURE 4 with the hook portion located in extended position.

Referring now to FIGURES 1, 2 and 3 of the drawings, a vehicle body support member or roof side rail 10 includes an aperture or opening 12 which is adapted to receive an article supporting member or coat hook 14 according to this invention. The side rail 10 is adapted to be covered by the conventional headlining 16 that is split adjacent opening 12 to permit mounting of coat hook 14.

Coat hook 14 is preferably formed of molded plastic, such as polypropylene, and includes a flat body portion 18 defining a central aperture 19 opening into the interior of side rail 10 through aperture 12. Body portion 18 is fastened to side rail 10 by any conventional means, such as by screws 20. The lower end of body portion 18 includes a slot 22 which fits over the lower edge 24 of side rail aperture 12 and a flap of headlining 16 to assist in retention of the coat hook within the side rail aperture flat against side rail 10.

Coat hook 14 includes a hook portion 26 within aperture 19 which is connected to body portion 18 by an integral hinge portion 28. The hinge portion 28 is weakened at 30, FIGURE 2, to permit swinging movement of hook portion 26 thereabout, but is sufficiently strong to resiliently retain hook portion 26 in its stored position.

Body portion 18 is formed with a depression 35 to enable manual grasping of upper edge 36 for movement of hook portion 26 to its extended operative position, as shown in broken lines, against the resilient force of hinge portion 28. Hook portion 26 includes a flange 38 to assist in the retention of suspended articles, such as coats, hangers, etc., in operative position. Upon removal of the suspended articles, the resiliency of hinge portion 28 will move hook portion 26 to its stored position substantially flush with body portion 18.

A retaining member 40 is formed integrally with and extends from hook portion 26 interiorly of side rail 10. The upper edge 42 of member 40 is engageable with the upper edge 44 of side rail aperture 12 to limit the outward movement of hook portion 26. Inward movement of the hook portion is limited by engagement of upper edge 36 with aperture edge 44.

Thus the embodiment shown in FIGURES 1 through 3 provides a unitary flexible molded plastic coat hook having a hook portion which is biased into a flat stored position by a resilient hinge and which is manually movable to an extended operative position.

Another embodiment of this invention is shown in FIGURES 4 and 5, wherein like elements are indicated by like prime numerals. In this embodiment coat hook 14' is molded so that, in its unstressed condition, hinge portion 28' normally locates hook portion 26' in its extended operative position, with edge 42' abutting the aperture edge 44'. Hook portion 26' is manually movable to the broken line position substantially flush with body portion 18'. Otherwise this embodiment is structurally the same as the first embodiment.

While only two embodiments of this invention have been shown and described, further modifications thereof will become obvious to the routineer and are contemplated within the scope of this invention.

I claim:

1. In combination with a vehicle body having a support member including an aperture therein, a unitary coat hook adapted for mounting on the support member adjacent the aperture, comprising a body portion, means for mounting the body portion to the support member peripherally of the support member aperture, the body portion including a central aperture opening into the support member through the support member aperture, a hook portion, a hinge portion interconnecting the hook portion and the body portion and adapted to permit swinging movement of the hook portion relative to the body portion between a stored position within the body portion aperture and an operative position outwardly of the support member and body portion, and stop means on the hook portion for limiting the outward swinging movement of the hook portion.

2. The combination according to claim 1, wherein the stop means comprise a member extending from the hook portion interiorly of the vehicle body support member and engageable with a portion of the support member to limit the outward swinging movement of the hook portion.

3. The combination according to claim 1, wherein the hinge portion is resilient and normally biases the hook portion to its operative position outwardly of the body portion.

4. The combination according to claim 1, wherein the hinge portion is resilient and normally biases the hook portion to its stored position within the body portion aperture.

5. The combination according to claim 2, wherein the hook portion includes means engageable with a portion of the support member to limit the inward swinging movement of the hook portion.

References Cited

UNITED STATES PATENTS

| | | | |
|---|---|---|---|
| 129,556 | 7/1872 | Haupt | 248—294 |
| 2,390,257 | 12/1945 | Jahn | 248—294 |
| 2,602,622 | 7/1952 | Smith | 248—294 XR |
| 2,706,049 | 4/1955 | Andrews | 211—86 |

JOHN PETO, *Primary Examiner.*